(12) United States Patent
Peer

(10) Patent No.: US 11,645,621 B2
(45) Date of Patent: May 9, 2023

(54) METHOD OF OPTIMIZING EMPLOYEE COMMUNICATION TO IMPROVE WORKPLACE ENGAGEMENT AND RETENTION

(71) Applicant: Humaxa, Inc., Cameron Park, CA (US)

(72) Inventor: Carolyn Peer, Cameron Park, CA (US)

(73) Assignee: Humaxa, Inc., Cameron Park, CA (US)

( * ) Notice: Subject to any disclaimer, the term of this patent is extended or adjusted under 35 U.S.C. 154(b) by 280 days.

(21) Appl. No.: 17/135,993

(22) Filed: Dec. 28, 2020

(65) Prior Publication Data

US 2021/0201267 A1 Jul. 1, 2021

Related U.S. Application Data

(60) Provisional application No. 62/954,356, filed on Dec. 27, 2019.

(51) Int. Cl.
*G06Q 10/10* (2023.01)
*G06F 40/35* (2020.01)
*G06N 5/02* (2023.01)

(52) U.S. Cl.
CPC ............ *G06Q 10/10* (2013.01); *G06F 40/35* (2020.01); *G06N 5/02* (2013.01)

(58) Field of Classification Search
CPC ...................................................... G06Q 10/10
See application file for complete search history.

(56) References Cited

U.S. PATENT DOCUMENTS

| 2015/0256675 | A1* | 9/2015 | Sri ..................... H04M 3/5183 379/265.09 |
| 2017/0250930 | A1* | 8/2017 | Ben-Itzhak ............ G06F 3/0488 |
| 2019/0096394 | A1* | 3/2019 | Ramachandra Iyer ..................... G10L 15/1815 |
| 2019/0303218 | A1* | 10/2019 | Kantor ..................... G06F 9/485 |
| 2020/0159991 | A1* | 5/2020 | Chittari ................. H04L 51/216 |

FOREIGN PATENT DOCUMENTS

WO WO-2005048067 A2 * 5/2005 ....... G06F 17/30979

* cited by examiner

*Primary Examiner* — Gabrielle A McCormick

(57) ABSTRACT

A system and method of optimizing employee communication to improve workplace engagement and retention is a data collection, storage, and processing software program that can improve employee retention and job performance by employing each employee with an accessible, personalized chatbot assistant. The chatbot assistant directly interacts with an employee to determine optimal solutions based on the employee's implicit or explicit needs and aspirations. The chatbot assistant further makes suggestions based on interactions with the employee and automatically implements any solutions chosen by the employee. Conversational data is collected and used to calculate optimal interactions with each employee. Such data is also valuable in calculating and responding to employee sentiment, thereby improving retention by responding to those calculated emotional scores. The system further enables an employer to engage with employees directly in anonymous conversation, thus facilitating transfer of essential workplace experience information that is otherwise difficult to obtain.

12 Claims, 21 Drawing Sheets

(A) Providing a plurality of employee profiles managed by at least one remote server, wherein each employee profile is associated with a corresponding employee personal computing (PC) device, and wherein each employee profile includes a conversation history, a sentiment history, and a decision history

(B) Providing a suggested activity engine managed by the remote server

(C) Receiving at least one piece of conversational data from at least one arbitrary profile with the remote server, wherein the arbitrary profile is any profile from the plurality of employee profiles

(D) Processing the piece of conversation data into a plurality of context scores with the remote server

(E) Assessing at least one available activity for the arbitrary profile in relation to the context scores, the conversation history, the sentiment history, and the decision history for the arbitrary profile with the remote server

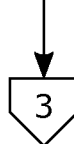

FIG. 2

METHOD OF OPTIMIZING EMPLOYEE COMMUNICATION TO IMPROVE WORKPLACE ENGAGEMENT AND RETENTION

The current application claims a priority to the U.S. Provisional Patent application Ser. No. 62/954,356 filed on Dec. 27, 2019. The current application is filed on Dec. 28, 2020 while Dec. 27, 2020 was on a weekend.

FIELD OF THE INVENTION

The present invention generally relates to human resources management systems and artificial intelligence (AI) chatbots. More specifically, the method of optimizing employee communication to improve workplace engagement and retention provides an AI chatbot assistant designed to improve employee retention and satisfaction.

BACKGROUND OF THE INVENTION

It has long been known that happy, fulfilled employees make for the best, most productive workers. However, there is often a large separation between employees and their employers, often due to management styles or differences in types of tasks between the two groups. Managers and owners are commonly preoccupied with protecting or developing the company on a large scale and may therefore become out-of-touch with the lives of their employees. It is therefore in the best interest of an employer to invest in providing employees with the support they need to perform at their best. Human resource departments were developed to address this issue. Human resource workers serve as the liaison between employers and their employees. They are commonly given tasks such as managing employee hiring, coordination of employee benefits and documentation, communication of policy information, and more. Among the important roles of a human resources department is managing employee satisfaction.

However, such a task may prove to be difficult. A human resource agent must deal with employees when they are unhappy in order to prevent them from disrupting management or quitting. A variety of factors may influence employee sentiment, consequently affecting employee career satisfaction. When emotionally stimulated, people become generally less prepared or willing to respond in the best interest of a company; it is easy to imagine a scenario in which a conversation between a human resources worker and a dissatisfied employee results in worsening of employee satisfaction. Further, human resources departments may be misconstrued as an extraneous expense or dismissed altogether by a company trying to save money. Human resources departments are also often unable to assist employees with their work in meaningful ways. What is needed is a system that can automatically communicate with employees and manage employee relationships. Further desirable is a system that can improve employee work sentiment and retention through data collection and machine learning analysis.

The present invention addresses these issues. The method of optimizing employee communication to improve workplace engagement and retention is a data collection, storage, and processing software program that can improve employee retention and job performance by employing each employee with an accessible, personalized chatbot assistant. The chatbot assistant directly interacts with an employee to determine optimal solutions based on the employee's implicit or explicit needs and aspirations. The chatbot assistant further makes suggestions based on interactions with the employee and automatically implements any solutions chosen by the employee. Conversational data is collected and used to calculate optimal interactions with each employee. The present invention further enables an employer to engage with employees directly in anonymous conversation, thus facilitating transfer of essential workplace experience information that is otherwise difficult to collect.

BRIEF DESCRIPTION OF THE DRAWINGS

FIG. 2 is a process flow diagram representing an overview of the present invention.

DETAILED DESCRIPTION OF THE INVENTION

All illustrations of the drawings are for the purpose of describing selected versions of the present invention and are not intended to limit the scope of the present invention.

Figure 1:
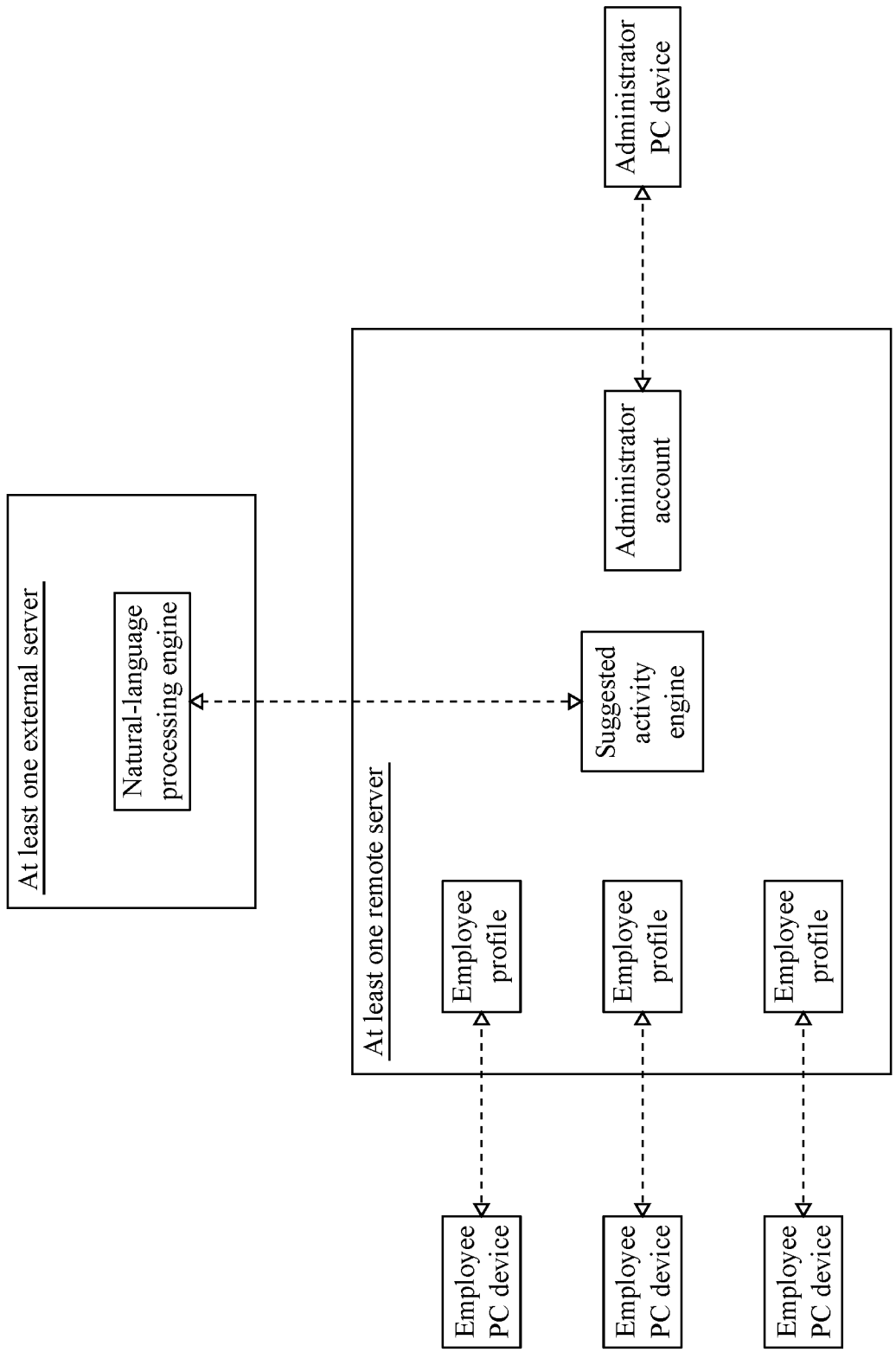
FIG. 1 is a process flow diagram representing the overall system.
Figure 20:
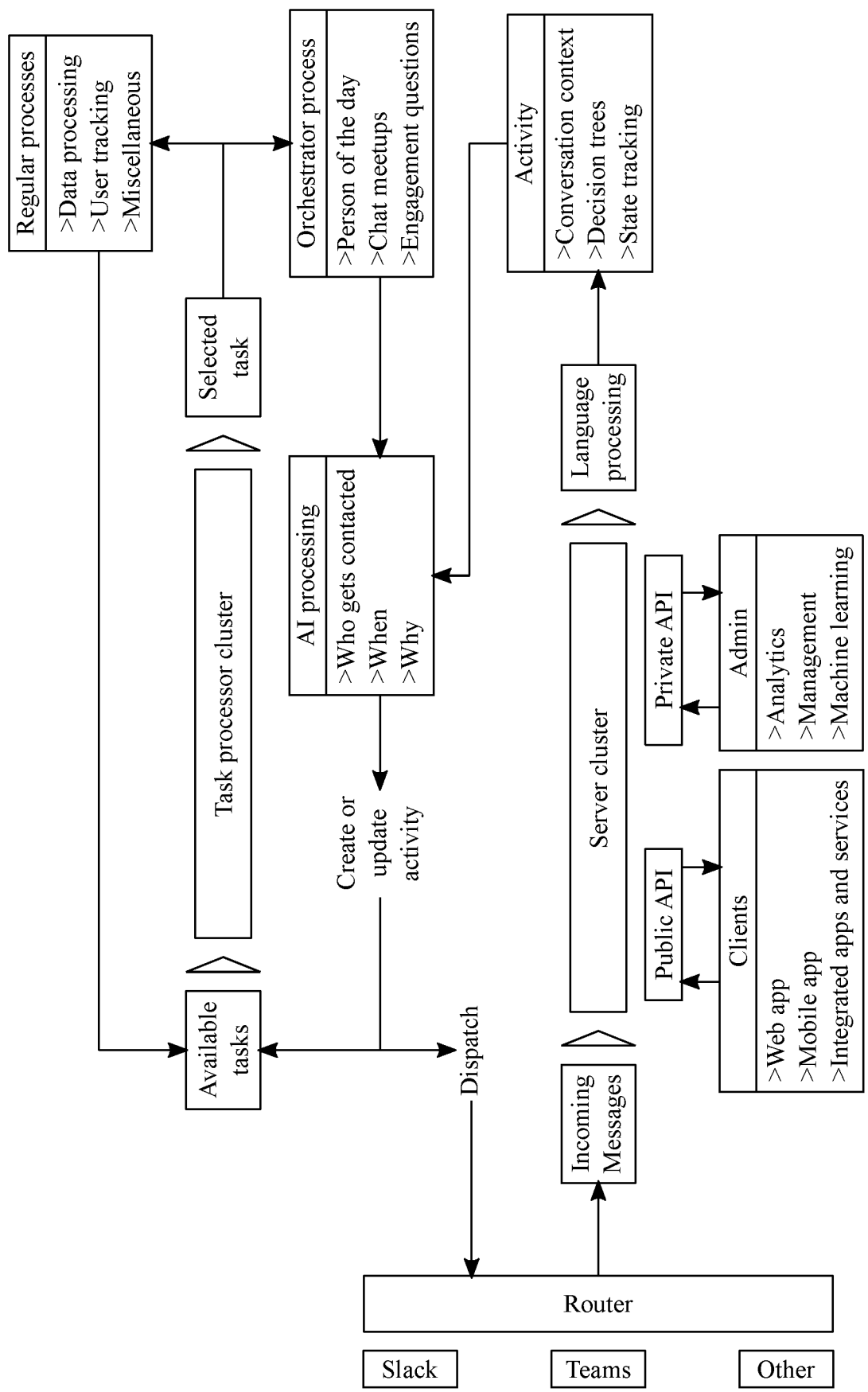
FIG. 20 is a process flow diagram representing an exemplary embodiment of the present invention.
Figure 21:
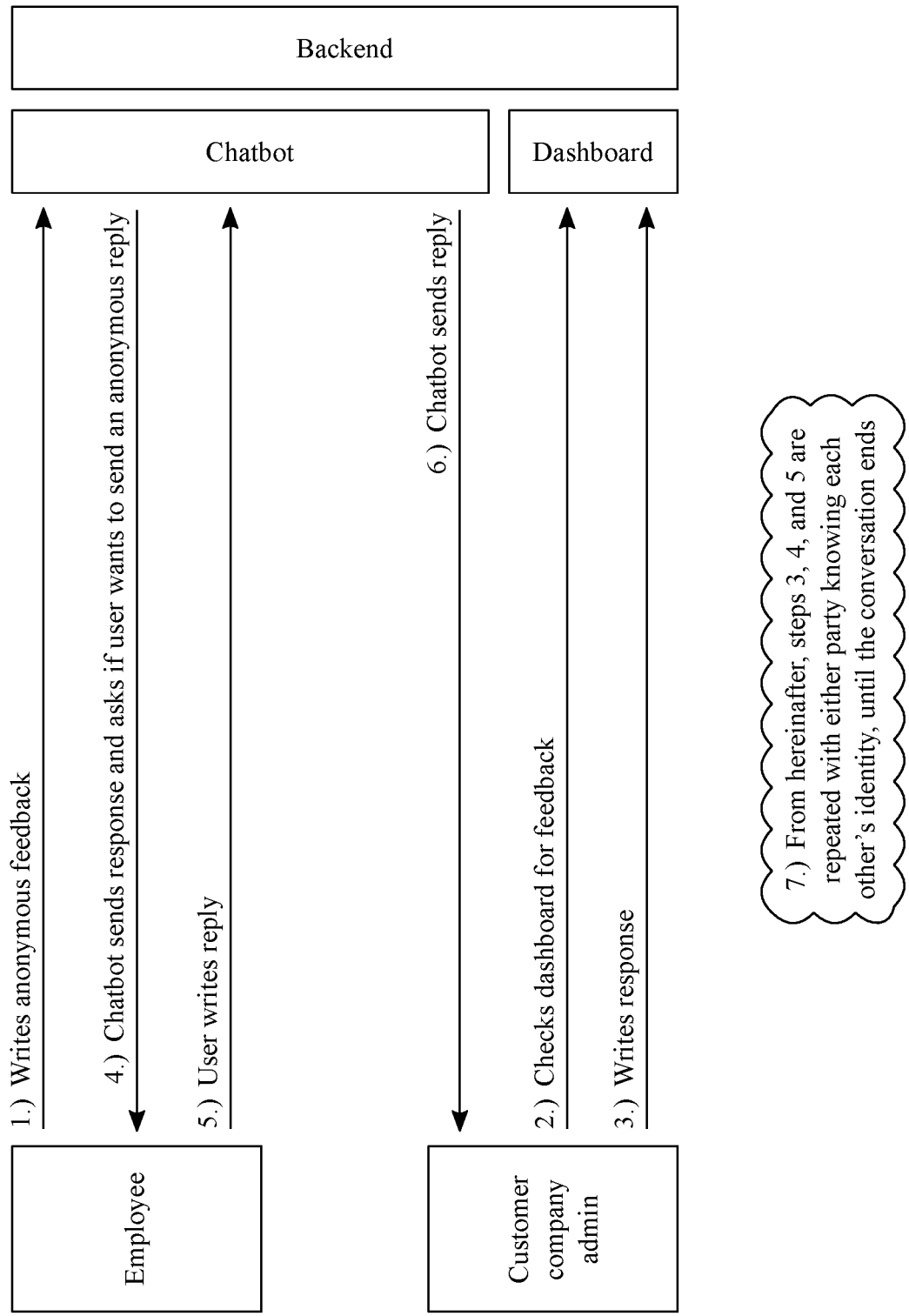
FIG. 21 is a process flow diagram representing an exemplary embodiment of a courier system.

The present invention is a system and method of optimizing employee communication to improve workplace engagement and retention that provides a system for enhancing employee job satisfaction by facilitating employee communication. The present invention accomplishes this by providing an artificial intelligence (AI)-driven messaging system that collects and analyzes data and subsequently returns appropriate conversational responses, as shown in FIGS. 1, 20, and 21. The system of the present invention includes a plurality of employee profiles managed by at least one remote server, wherein each employee profile is associated with a corresponding employee personal computing (PC) device, and wherein each employee profile includes a conversation history, a sentiment history, and a decision history (Step A). The at least one remote server relates to a set of computers, databases, and other processing and storage units capable of performing preprogrammed commands to collect user inputs, analyze data, generate displays, and present information to appropriate parties. The plurality of employee profiles relates to a set of accounts associated with individuals working at a particular business or company. A corresponding employee PC device relates to any smartphone, desktop, laptop, smart apparel, or other such device or devices capable of communicating with the at least one remote server. The conversation history is the stored set of alphanumeric and punctuation characters which include each message received or sent by an employee profile, along with any associated metadata. The sentiment history denotes the stored set of conclusions calculated by the at least one remote server which represent the emotional status of an employee profile based on a variety of responses and metadata, such as time of day, time of year, holiday proximity, prompt type, and more. The decision history is the stored set of messages generated in response to a prompt for an employee profile. A suggested activity engine is provided and managed by the remote server (Step B), as represented in FIG. 2. The suggested activity engine relates to the internally programmed logic that enables the present invention to determine appropriate responses by evaluating scores and comparing potential responses to allowable or preferred responses.

The overall process followed by the method of the present invention allows for effective and efficient development of conversational material necessary to facilitate communication between an AI and an employee. The overall process begins by receiving at least one piece of conversation data from at least one arbitrary profile with the remote server, wherein the arbitrary profile is any profile from the plurality of employee profiles (Step C). The at least one piece of conversation data relates to an arrangement of alphanumeric and punctuation characters which form the words of a response by the arbitrary employee profile. The at least one piece of conversation data may include full sentences, sentence fragments, spelling decisions, and non-responses, as well as metadata such as timing information. The piece of conversation data is then processed into a plurality of context scores with the remote server (Step D). The plurality of context scores relates to the values associated with a variety of calculated social metrics, such as overall satisfaction, happiness, frustration, exhaustion, and more. Analysis of the plurality of context scores enables the present invention to approximate the mood of an employee and subsequently generate an optimal response. At least one available activity is assessed for the arbitrary profile in relation to the context scores, the conversation history, the sentiment history, and the decision history for the arbitrary profile with the remote server (Step E). The at least one available activity relates to a set of potentially-appropriate responses, including any text, rhetorical devices, pauses, unconventional characters, task-related actions, and more, that may be generated by the present invention as a potentially-appropriate response. In this way, the present invention may determine desirable responses using both the piece of conversation data recently inputted by the arbitrary employee profile and any stored historical data.

Figure 3:
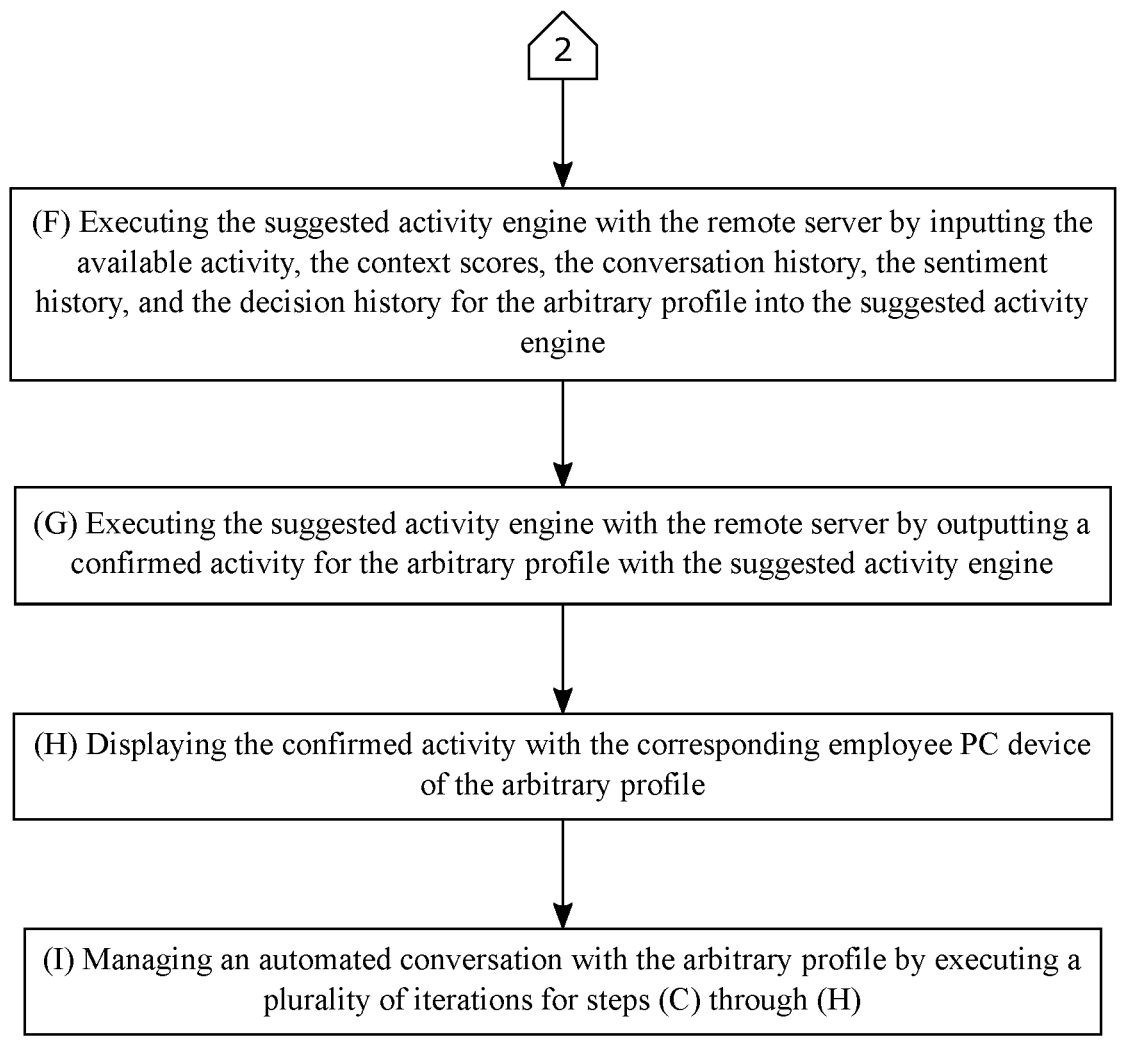
FIG. 3 is a continuation of FIG. 2.

The overall process continues by executing the suggested activity engine with the remote server by inputting the available activity, the context scores, the conversation history, the sentiment history, and the decision history for the arbitrary profile into the suggested activity engine (Step F), as represented in FIG. 3. The suggested activity engine enables the application of a variety of different rules and activity-filtering strategies that are either generated through machine learning (ML) or AI technologies or otherwise explicitly commanded by an administrator. Subsequently, the suggested activity engine is further executed with the remote server by outputting a confirmed activity for the arbitrary profile with the suggested activity engine (Step G). The confirmed activity is the response deemed most appropriate following processing by the suggested activity engine. The confirmed activity is then displayed with the corresponding employee PC device of the arbitrary profile (Step H). The display may include conversational text, confirmation of completion of a task, any appropriate visual information requested by the arbitrary profile, various useful forms or employee inputs, or more. An automated conversation with the arbitrary profile is managed by executing a plurality of iterations for Steps C through H (Step I). Thus, all data collected, stored, and generated during the process of the present invention may be leveraged to improve future communication with the arbitrary profile, thereby enabling the AI of the present invention to adapt and improve communication ability for each employee.

Figure 4:
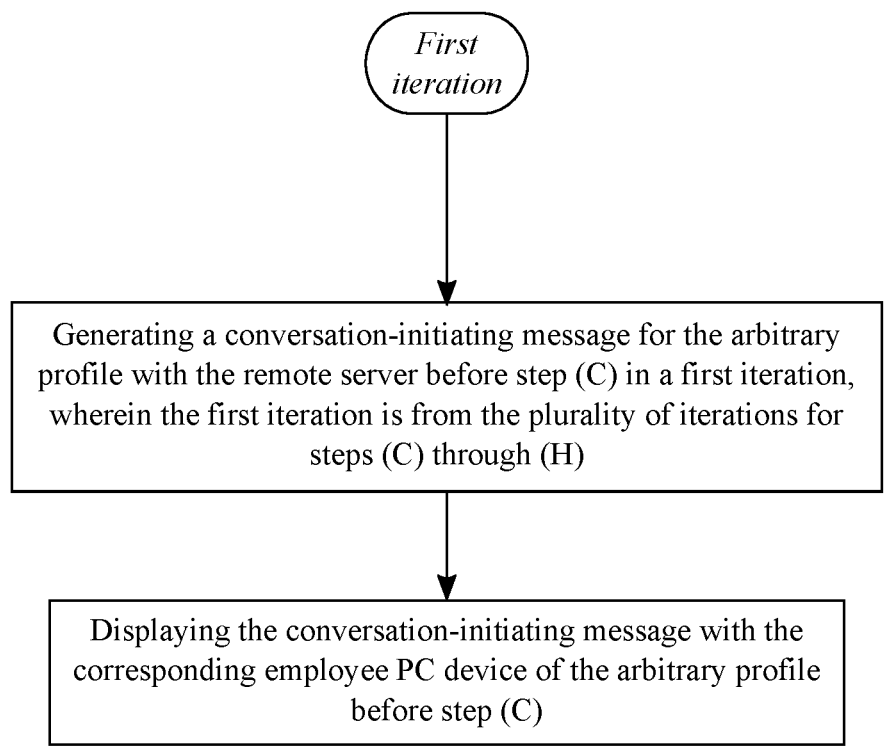
FIG. 4 is a process flow diagram representing initialization of a conversation.

The present invention requires the ability to initialize a conversation with a new, previously-unknown employee or user and subsequently develop conversational literacy with the new user. To this end, a conversation-initiating message for the arbitrary profile may be generated with the remote server before Step C in a first iteration, wherein the first iteration is from the plurality of iterations for Steps C through H, as represented in FIG. 4. The conversation-initiating message may be as simple as a basic greeting, or may utilize metadata about the time, date, or the user's company profile to pre-assess the arbitrary profile and thus generate a more customized conversation starter. The conversation-initiating message is displayed with the corresponding employee PC device of the arbitrary profile before Step C. In this way, the present invention may automatically prompt the arbitrary profile in order to initialize data collection necessary for sentiment analysis.

Figure 5:
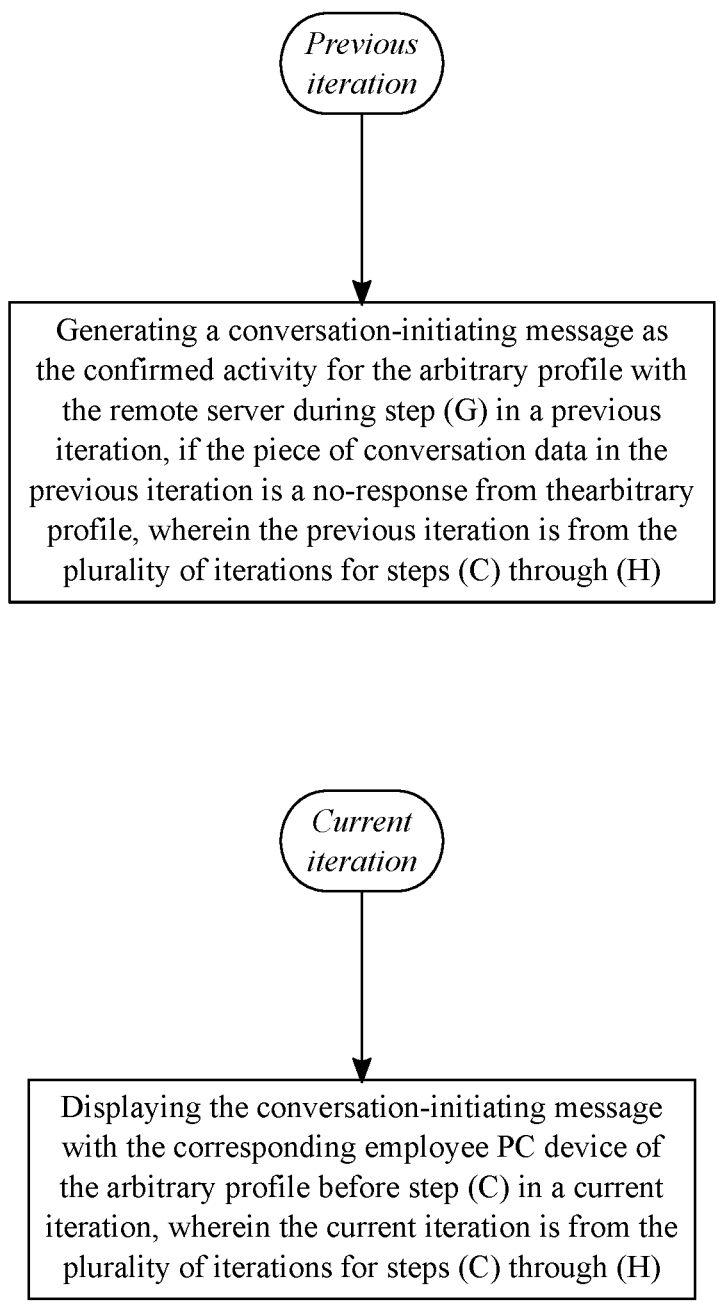
FIG. 5 is a process flow diagram representing sustaining a conversation with no response.

It is likely that an arbitrary profile will not always respond to the present invention each time the present invention attempts to begin a conversation. To account for this likely event, a conversation-initiating message may be generated as the confirmed activity for the arbitrary profile with the remote server during Step G in a previous iteration, if the piece of conversation data in the previous iteration is a no-response from the arbitrary profile, wherein the previous iteration is from the plurality of iterations for Steps C through H, as represented in FIG. 5. A no-response relates to any data obtained when a user opts not to respond to a prompt from the present invention. The conversation-initiating message is generated in response to all available data in order to prevent the present invention from pestering an employee who is perceived to be busy, annoyed, or otherwise unlikely to respond at a given date or time while simultaneously preventing conversational flow from devolving entirely. The conversation-initiating message is displayed with the corresponding employee PC device of the arbitrary profile before Step C in a current iteration, wherein the current iteration is from the plurality of iterations for Steps C through H. In this way, contact is maintained with employees who do not respond for a given amount of time.

Figure 6:
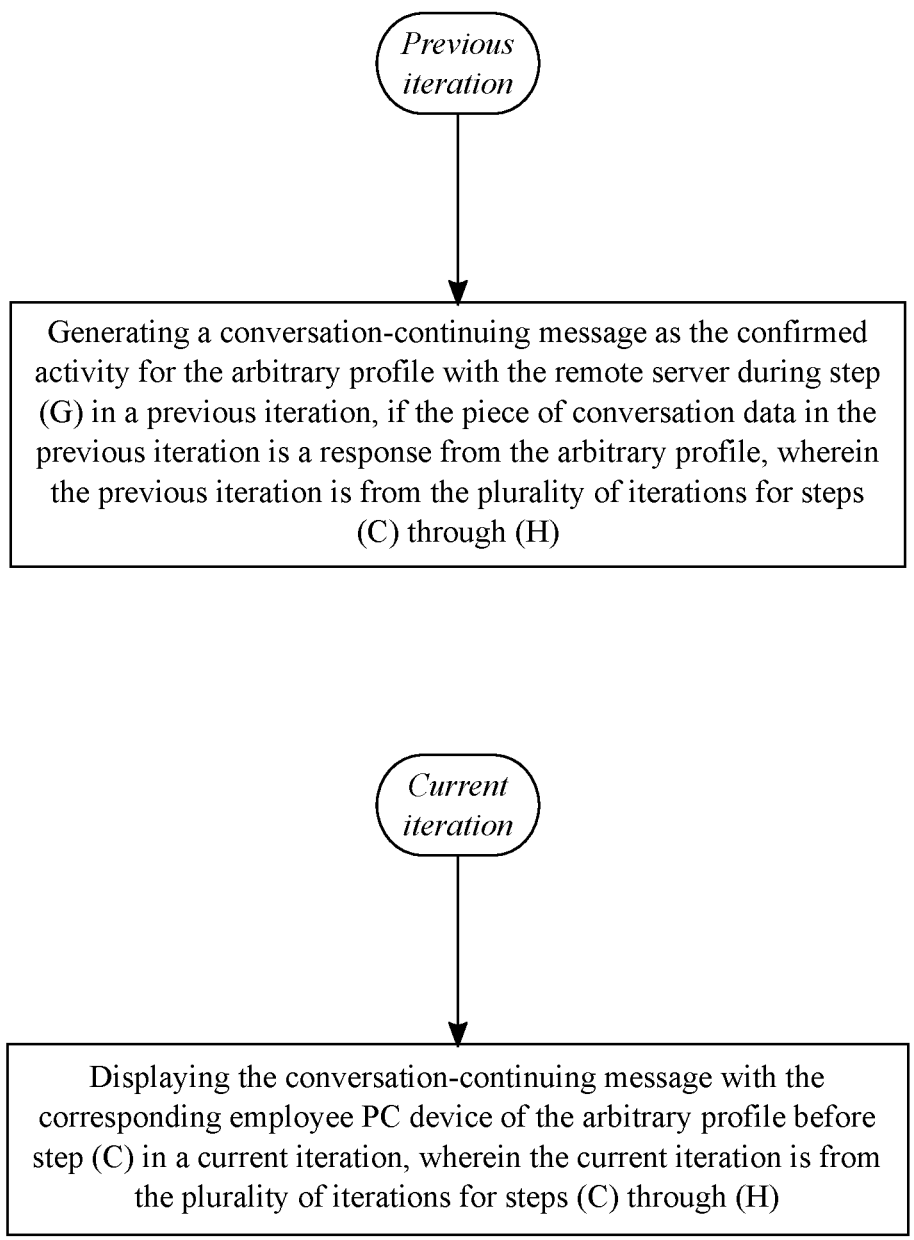
FIG. 6 is a process flow diagram representing sustaining a conversation with a response.

The arbitrary profile may choose to respond to a given prompt from the present invention. To account for a response from the arbitrary profile, a conversation-continuing message may be generated as the confirmed activity for the arbitrary profile with the remote server during Step G in a previous iteration, if the piece of conversation data in the previous iteration is a response from the arbitrary profile, wherein the previous iteration is from the plurality of iterations for Steps C through H, as represented in FIG. 6. A response relates to any data obtained when a user opts to respond to a prompt from the present invention. The provided response enables the present invention to continue to collect data by replying. The conversation-continuing message is then displayed with the corresponding employee PC device of the arbitrary profile before Step C in a current iteration, wherein the current iteration is from the plurality of iterations for Steps C through H. In this way, the present invention may discover, and subsequently address, employee needs by continuing an active conversation.

Figure 7:
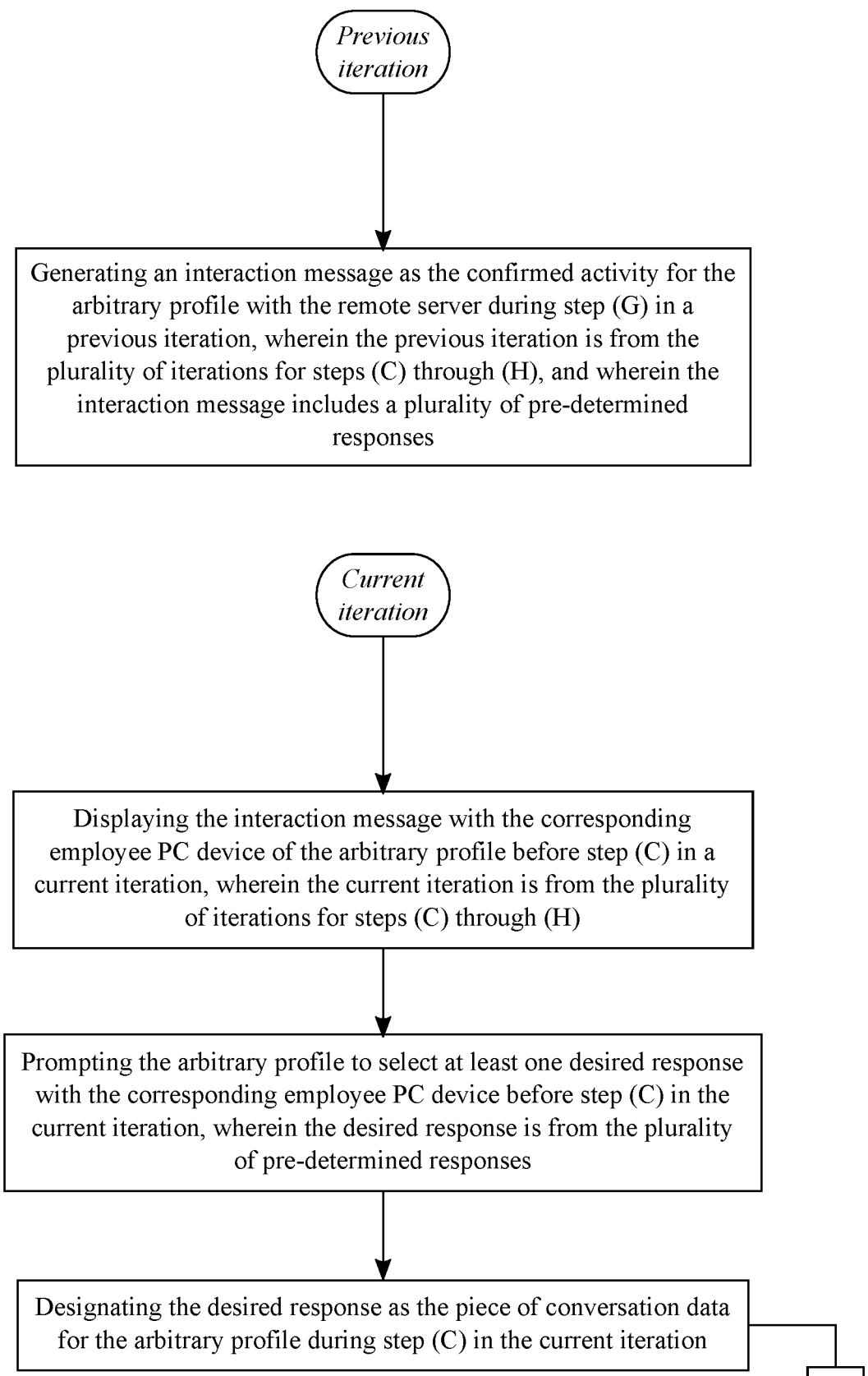
FIG. 7 is a process flow diagram representing providing a user with pre-determined responses.

In many cases, an employee response may warrant collection of explicit input from a variety of possible options from the arbitrary profile, as opposed to the combined explicit and implicit inputs generated and derived from a regular conversation. To enable collection of this data, an interaction message may be generated as the confirmed activity for the arbitrary profile with the remote server during Step G in a previous iteration, wherein the previous iteration is from the plurality of iterations for Steps C through H, and wherein the interaction message includes a plurality of pre-determined responses, as represented in FIG. 7. The plurality of pre-determined responses relates to an ordered or unordered list of radio button, checkbox, or other such textual options which may be selected by a user during an interaction with the present invention. The interaction message is next displayed with the corresponding employee PC device of the arbitrary profile before Step C in a current iteration, wherein the current iteration is from the plurality of iterations for Steps C through H. In this way, the arbitrary profile is provided with a list of potential responses, each of which may warrant a different response from the present invention. The arbitrary profile is next prompted to select at least one desired response with the corresponding employee PC device before Step C in the current iteration, wherein the desired response is from the plurality of pre-determined responses. Such an interaction reduces the amount of deduction required to understand the goals or needs of the arbitrary profile. Finally, the desired response is designated as the piece of conversation data for the arbitrary profile during Step C in the current iteration. In this way, the present invention may facilitate communication and data collection by providing suggested responses to different prompts.

Figure 8:
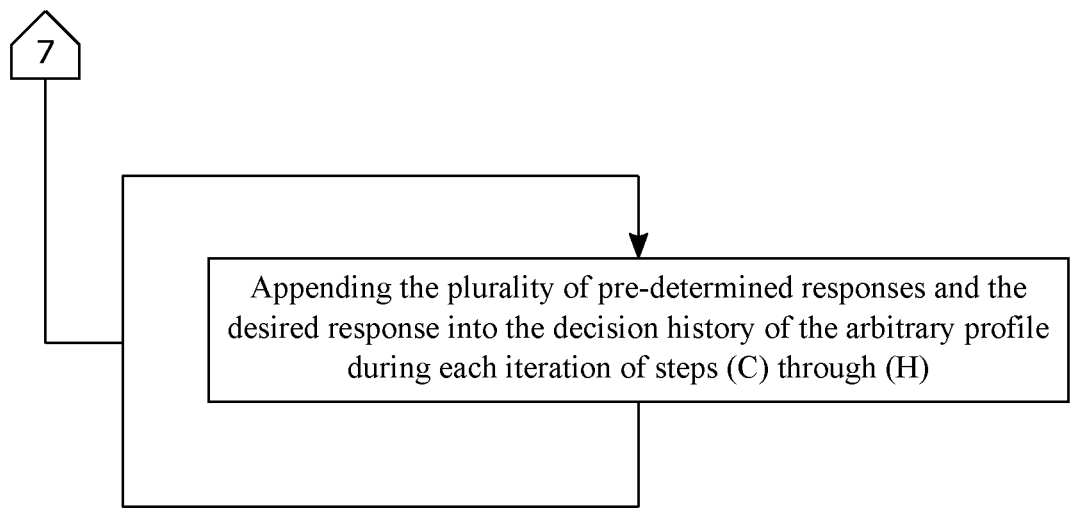
FIG. 8 is a process flow diagram representing appending responses to the decision history.

Such response-selection decisions are often useful in determining or predicting future employee responses. To ensure this information is utilized optimally, the plurality of pre-determined responses and the desired response may be appended into the decision history of the arbitrary profile during each iteration of Steps C through H, as represented in FIG. 8. Thus, the present invention may develop future conversational replies based upon input from the plurality of pre-determined responses and the desired response.

Figure 9:
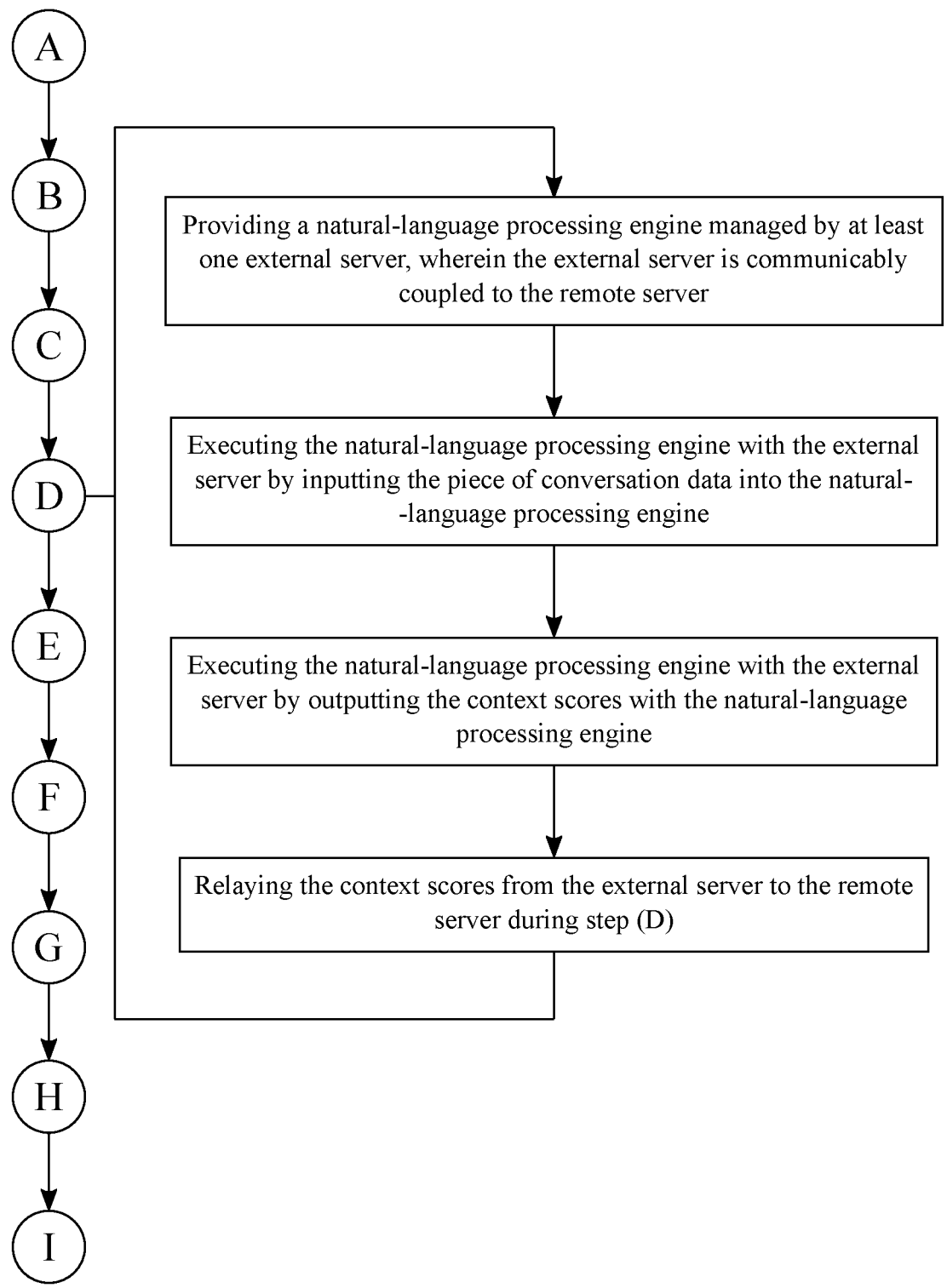
FIG. 9 is a process flow diagram representing use of a natural-language processing engine.

In order to convert conversational language into useful data that can be analyzed, the present invention must be capable of effectively deconstructing complex rhetoric, including language tools like sarcasm, potential local cultural influence, emojis, image or visual content, and more. To enable such analysis, a natural-language processing engine managed by at least one external server may be provided, wherein the external server is communicably coupled to the remote server, as represented in FIG. 9. The natural-language processing engine relates to a set of ML and AI programs which have been extensively trained upon different textual data in order to enable comprehension of conversational information. The external server is preferably managed and operated by a third-party natural-language processing organization. The natural-language processing engine is executed with the external server by inputting the piece of conversation data into the natural-language processing engine. In this way, the natural-language processing engine is supplied with appropriate textual information, thus enabling interpretation of the piece of conversation data. The natural-language processing engine is further executed with the external server by outputting the context scores with the natural-language processing engine. The context scores are a set of key-value pairs of emotions or general attitudes and numeric values which can be analyzed to approximate the overall employee sentiment. The context scores are relayed from the external server to the remote server during Step D. In this way, subsequent sentiment analysis may be conducted internally in response to externally extrapolated valuations of employee attitudes.

Figure 10:
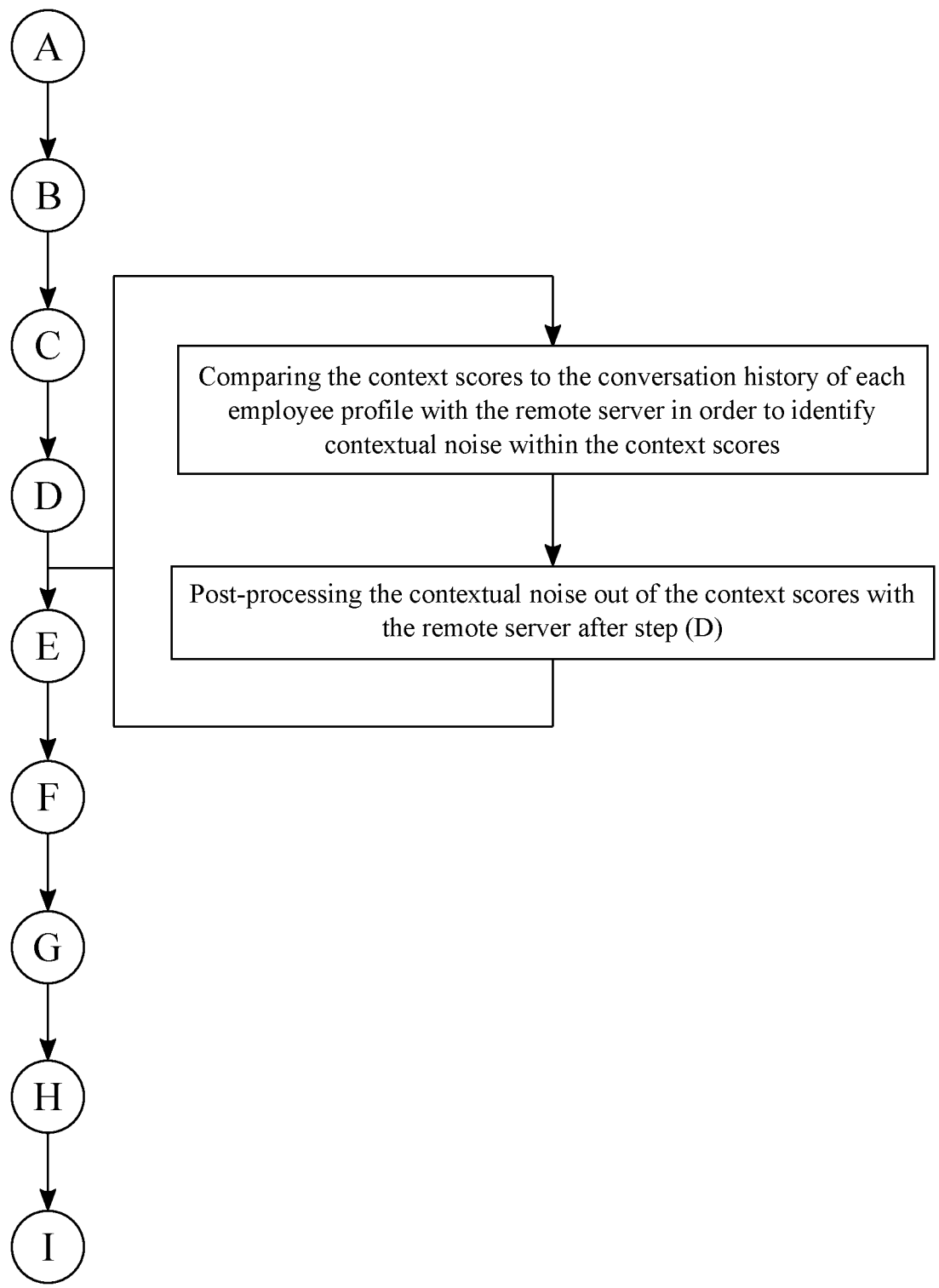
FIG. 10 is a process flow diagram representing detection of contextual noise using conversation history.

The context scores generated may contain data that is less valuable in determining a set of most-appropriate responses for a given employee profile than other data. To both minimize storage demand and facilitate necessary analysis, the context scores may be compared to the conversation history of each employee profile with the remote server in order to identify contextual noise within the context scores, as represented in FIG. 10. The contextual noise relates to information that is superfluous when placed in the context previously documented by the present invention. Contextual noise may include context scores that have already been determined to be relatively constant for a given employee profile and are therefore less valuable in determining employee sentiment than other, more dynamic scores. The contextual noise is then post-processed out of the context scores with the remote server after Step D. Parsing through the context scores in this way reduces extraneous or superfluous interpretation of the context scores.

Figure 11:
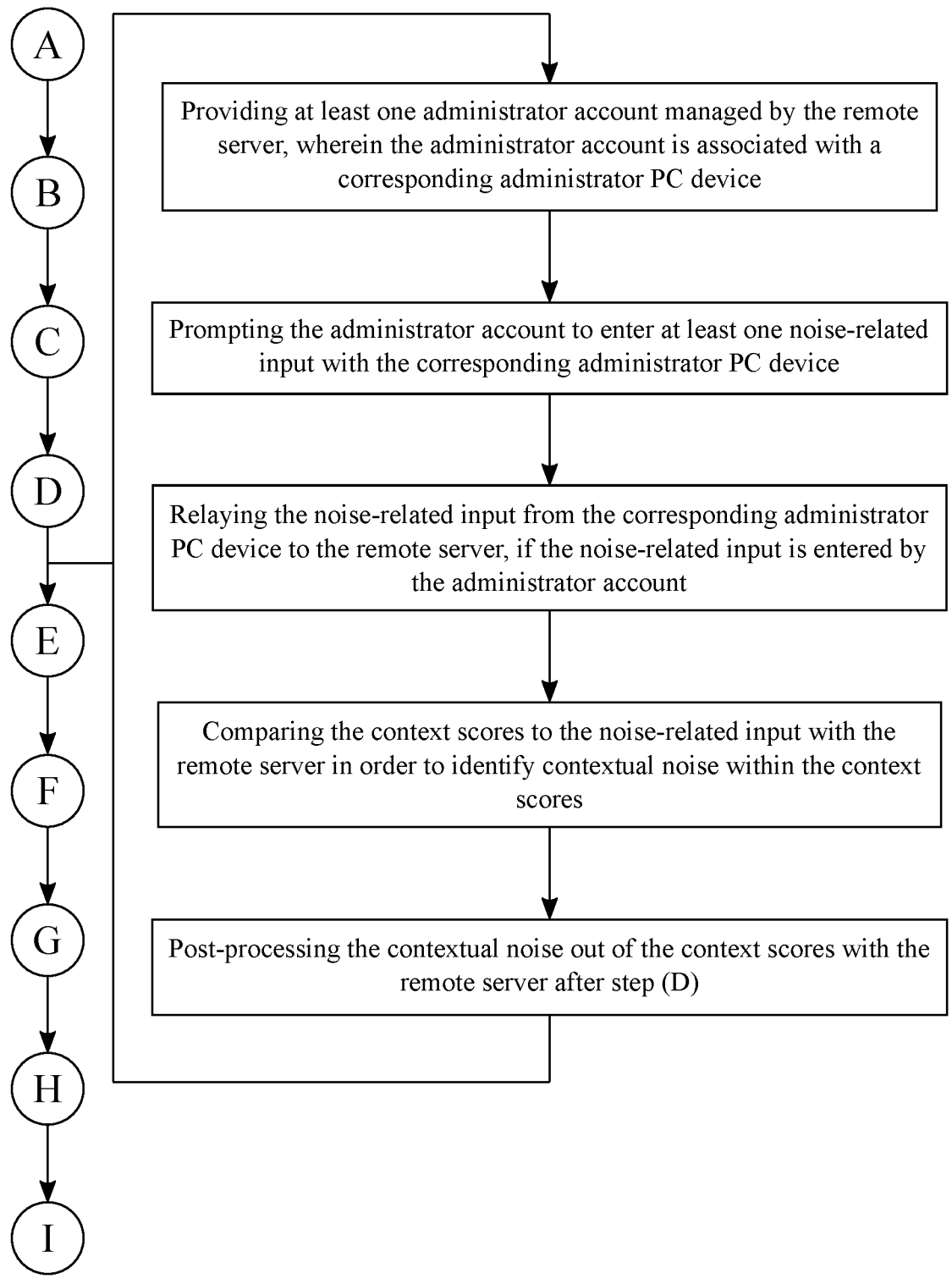
FIG. 11 is a process flow diagram representing detection of contextual noise using noise-related inputs.

An employer may desire to interface with the context scores and manually filter out noise from the context scores. To this end, at least one administrator account managed by the remote server may be provided, wherein the administrator account is associated with a corresponding administrator PC device, as represented in FIG. 11. An administrator account relates to user data and credential information associated with a managerial profile. The corresponding administrator PC device relates to any smartphone, desktop, laptop, smart apparel, or other such device or devices capable of allowing communication between an administrator account and the remote server. The administrator account is prompted to enter at least one noise-related input with the corresponding administrator PC device. The at least one noise-related input may relate to any of a variety of inputs understood to be extraneous by the administrator account. The noise-related input is then relayed from the corresponding administrator PC device to the remote server, if the noise-related input is entered by the administrator account. Thus, the remote server collects the noise-related input for subsequent analysis. The context scores are compared to the noise-related input with the remote server in order to identify contextual noise within the context scores. In this way, the noise-related input is integrated into the process of filtering out inappropriate, unhelpful, or otherwise undesirable information from the context scores. Finally, the contextual noise is post-processed out of the context scores with the remote server after Step D. Therefore, an employer or other administrator account holder may interface with the noise-identifying system of the present invention.

Figure 12:
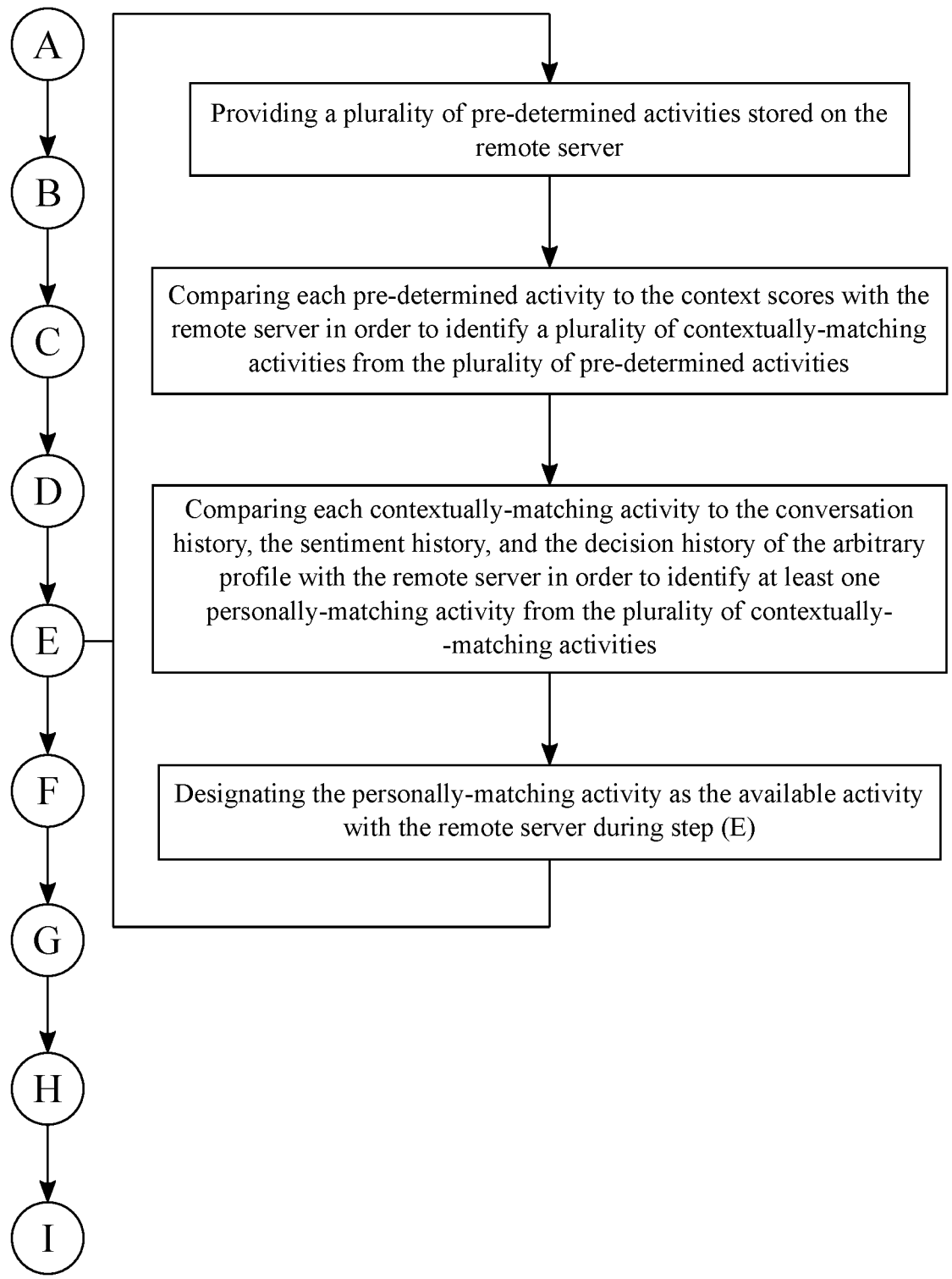
FIG. 12 is a process flow diagram representing determination of available activities through integration of pre-determined activities.

The present invention requires analysis of available actions and responses for each employee profile. To enable this analysis, a plurality of pre-determined activities may be stored on the remote server, as represented in FIG. 12. The plurality of pre-determined activities relates to information or a set of potential responses deemed appropriate prior to any employee profile-specific analysis by the remote server. Each pre-determined activity is compared to the context scores with the remote server in order to identify a plurality of contextually-matching activities from the plurality of pre-determined activities. This serves as an initial filtering step that prevents the remote server from pursuing options that are not allowed, such as responding to employee dissatisfaction by suggesting a career change or suggesting that the employee use work time to pursue other options. Each contextually-matching activity is next compared to the conversation history, the sentiment history, and the decision history of the arbitrary profile with the remote server in order to identify at least one personally-matching activity from the plurality of contextually-matching activities. In this way, the remote server may determine the most effective response from a smaller set of allowable responses, rather than from a larger set of all possible responses. The personally-matching activity is then designated as the available activity with the remote server during Step E. Thus, the remote server accounts for inappropriate potential responses before determining a most-appropriate response.

Figure 13:
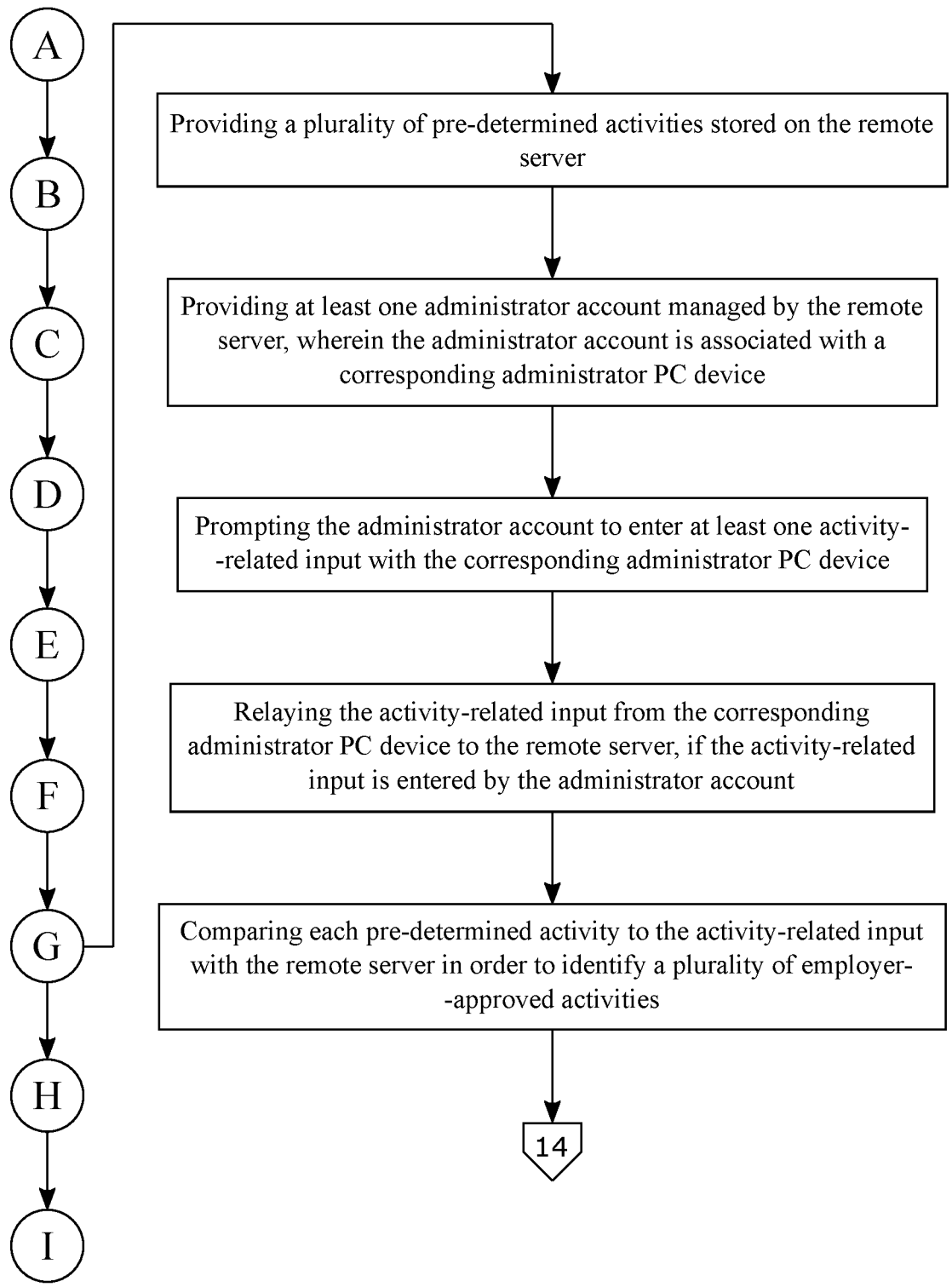
FIG. 13 is a process flow diagram representing determination of a confirmed activity through integration of pre-determined activities.
Figure 14:
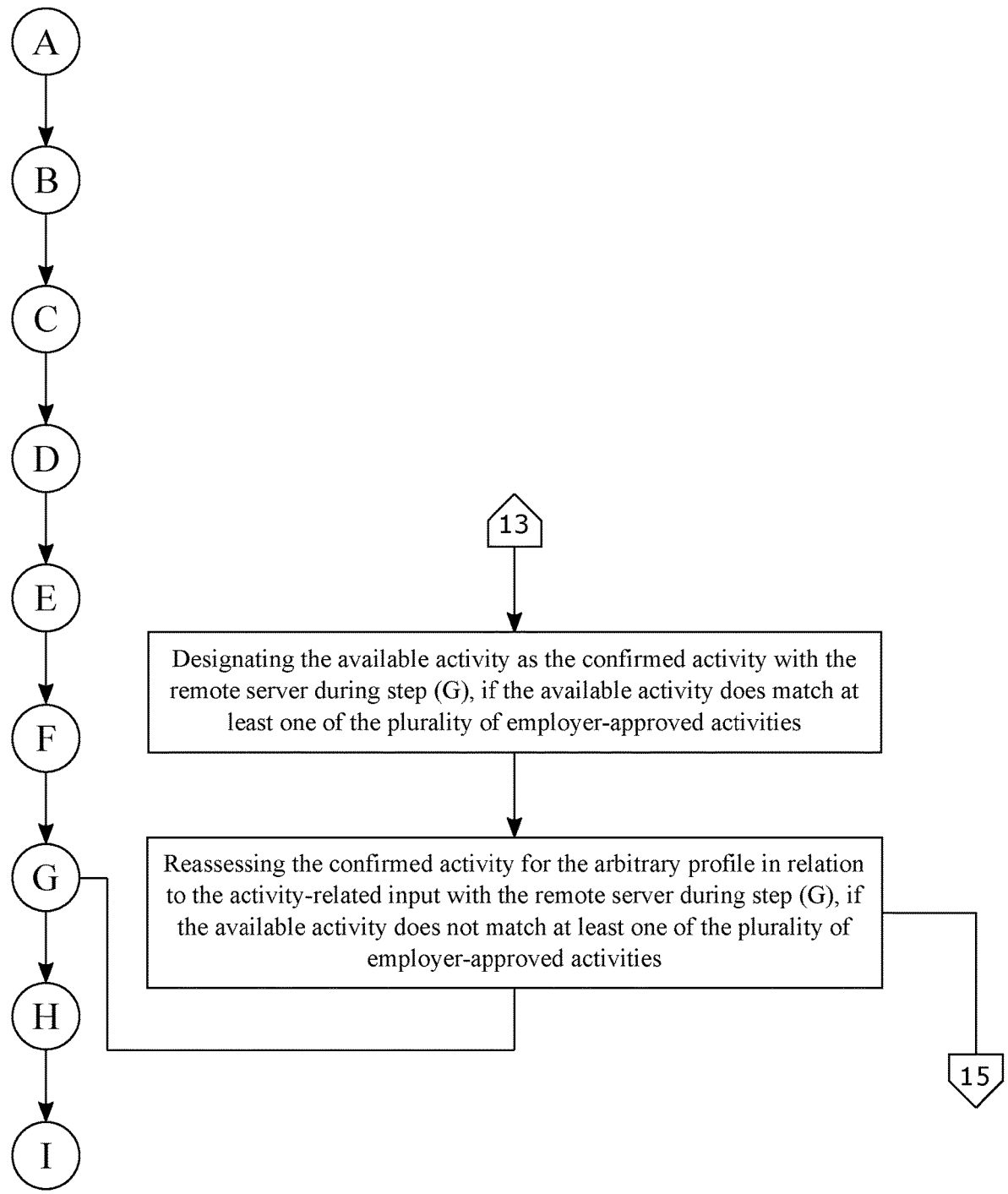
FIG. 14 is a continuation of FIG. 13.

It may be further advantageous to enable appropriate parties to view and modify activities that are allowable manually. To account for this, a plurality of pre-determined activities stored on the remote server may be provided, as represented in FIGS. 13 and 14. The plurality of pre-determined activities relates to information or a set of potential responses deemed appropriate prior to any employee profile-specific analysis by the remote server. At least one administrator account managed by the remote server may also be provided, wherein the administrator account is associated with a corresponding administrator PC device. The administrator account is prompted to enter at least one activity-related input with the corresponding administrator PC device. This arrangement enables the administrator account to interface directly with the plurality of pre-determined activities. The activity-related input is then relayed from the corresponding administrator PC device to the remote server, if the activity-related input is entered by the administrator account. This provides the remote server with the information necessary to integrate requirements from the administrator account into the plurality of pre-determined activities. Each pre-determined activity is compared to the activity-related input with the remote server in order to identify a plurality of employer-approved activities. In this way, activity-related inputs are explicitly approached and filtered through before arriving at a new set of pre-determined activities. The available activity is then designated as the confirmed activity with the remote server during Step G, if the available activity does match at least one of the plurality of employer-approved activities. Therefore, specifically-desired responses from the administrator account are given priority over generated responses when determining optimal responses for the arbitrary profile. The confirmed activity for the arbitrary profile is reassessed in relation to the activity-related input with the remote server during Step G, if the available activity does not match at least one of the plurality of employer-approved activities. In this way, responses can be directly managed by an administrator account as desired.

Figure 15:
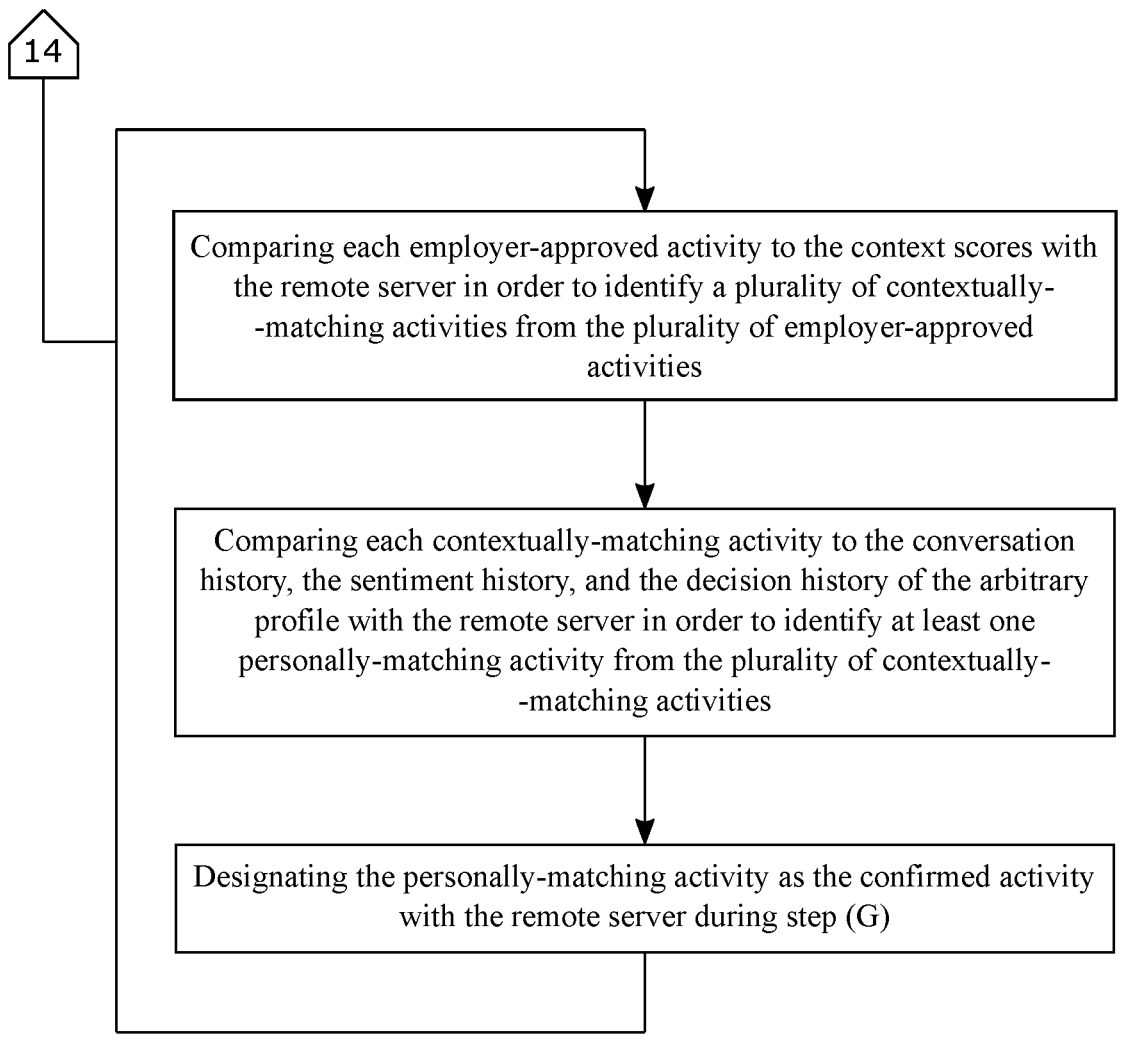
FIG. 15 is a process flow diagram representing determination of a confirmed activity through integration of historical data.

The present invention must be able to assess and select employer-approved activities as applicable to any of a variety of scenarios. To enable this, each employer-approved activity is compared to the context scores with the remote server in order to identify a plurality of contextually-matching activities from the plurality of employer-approved activities, as represented in FIG. 15. This arrangement pre-filters activities from the employer-approved activities based on relevance to the context scores. Each contextually-matching activity is then compared to the conversation history, the sentiment history, and the decision history of the arbitrary profile with the remote server in order to identify at least one personally-matching activity from the plurality of contextually-matching activities. In this way, employer-approved responses are selected based not only on relevance, but also subsequently reduced into a subset of most appropriate responses. Finally, the personally-matching activity is designated as the confirmed activity with the remote server during Step G. This arrangement ensures that only the most relevant employer-approved activities are possible for selection.

Figure 16:
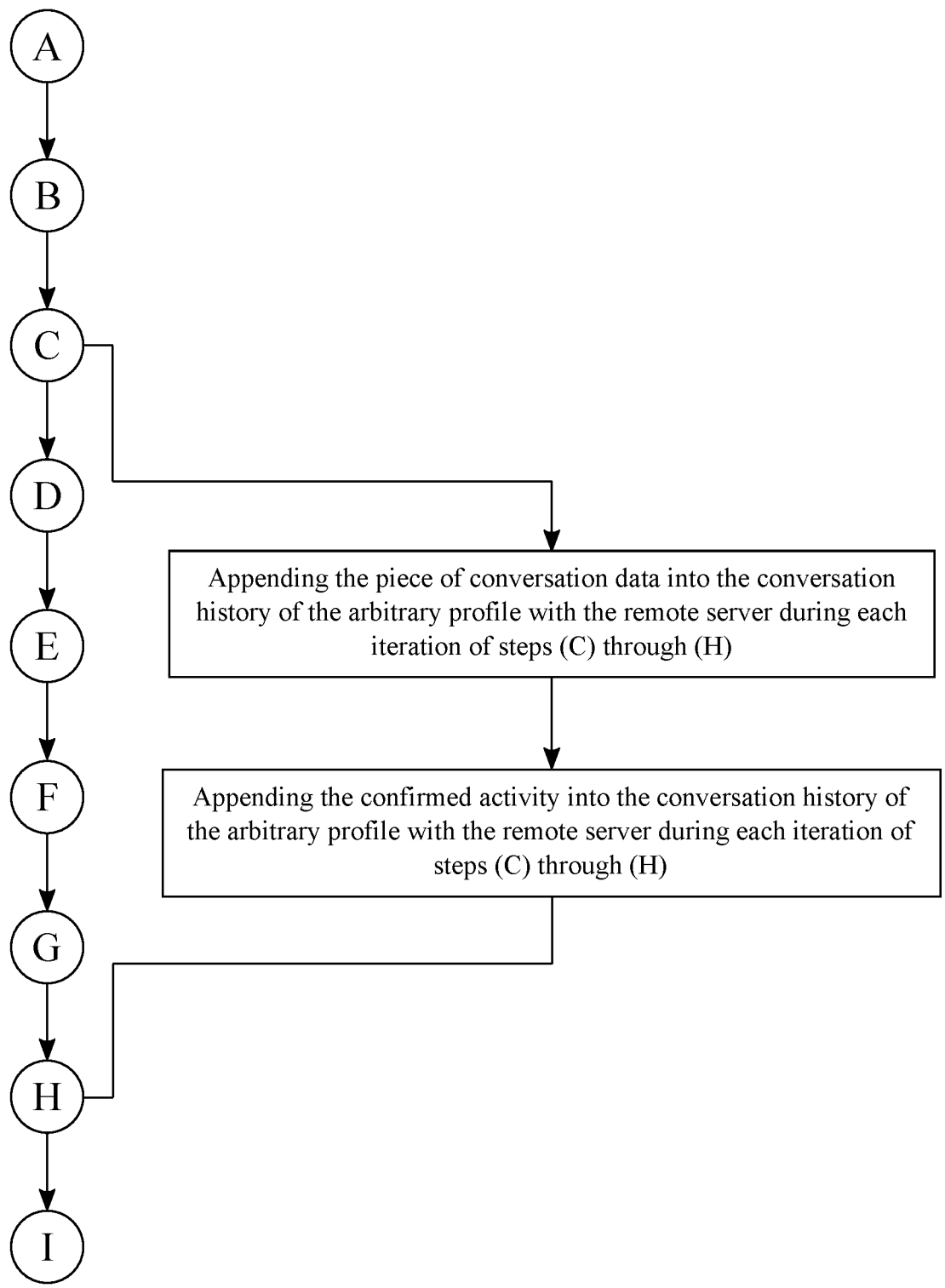
FIG. 16 is a process flow diagram representing appending conversation data to the conversation history.

Historical data storage and preservation of interactions is essential for developing an AI capable of improving conversational responses. To this end, the piece of conversation data is appended into the conversation history of the arbitrary profile with the remote server during each iteration of Steps C through H, as represented in FIG. 16. The piece of conversation data, including any alphanumeric, punctuation, symbolic, hyperlink, image, or other data, is highly valuable in the process of learning how to optimize conversation with an arbitrary profile. Furthermore, the confirmed activity is also appended into the conversation history of the arbitrary profile with the remote server during each iteration of Steps C through H. In this way, both user responses and automated reactions are stored, and both may be subsequently utilized in modulating employee responsiveness and improving employee satisfaction.

Figure 17:
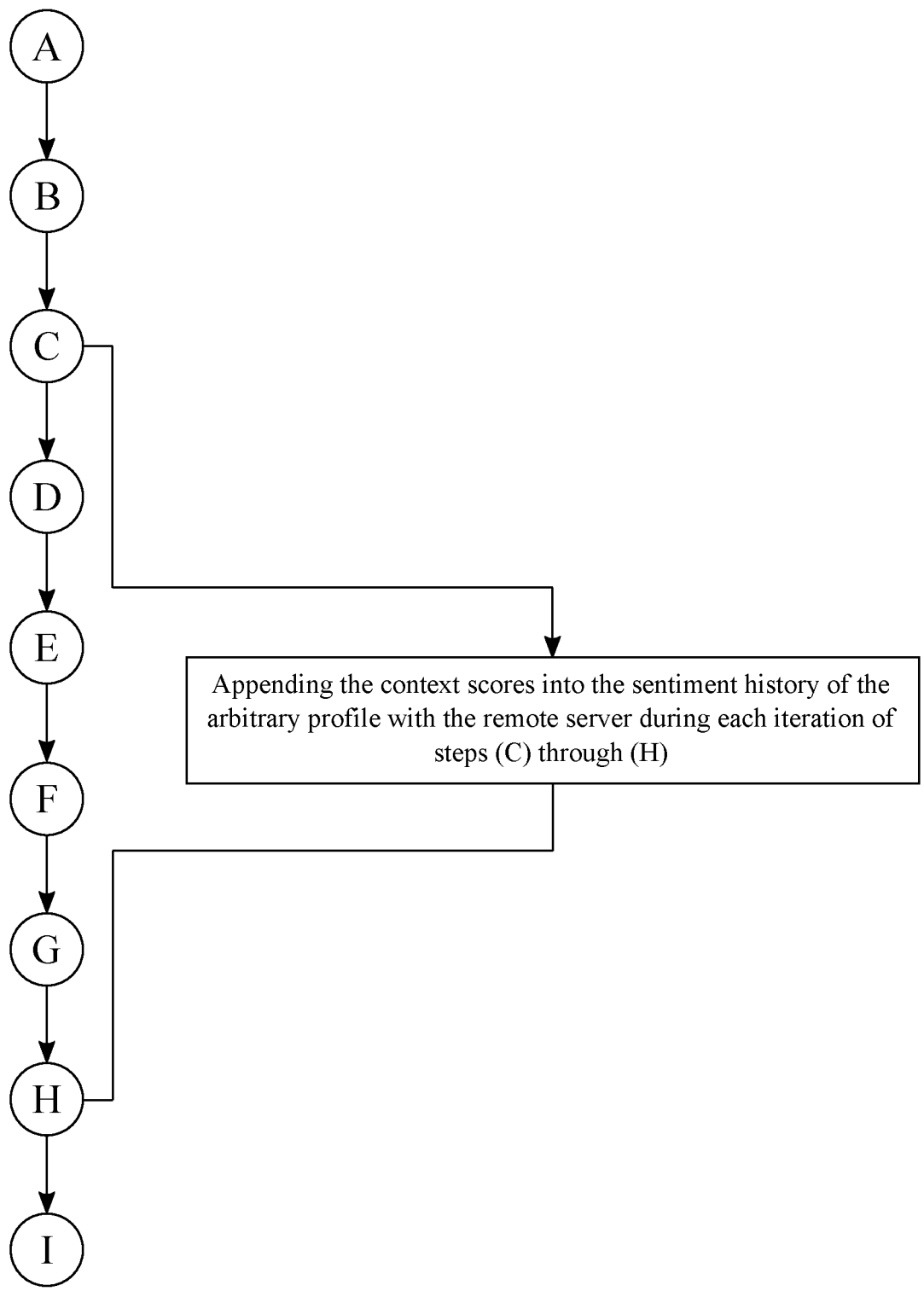
FIG. 17 is a process flow diagram representing appending context scores to the sentiment history.

Similarly, it is vital to record all context scores generated during the execution of data through the natural-language processing engine, and at various subsequent points through the automated decision-making process. Therefore, the context scores are appended into the sentiment history of the arbitrary profile with the remote server during each iteration of Steps C through H, as represented in FIG. 17. In this way, the AI is capable of improving by using various employee sentiments as metrics for success.

Figure 18:
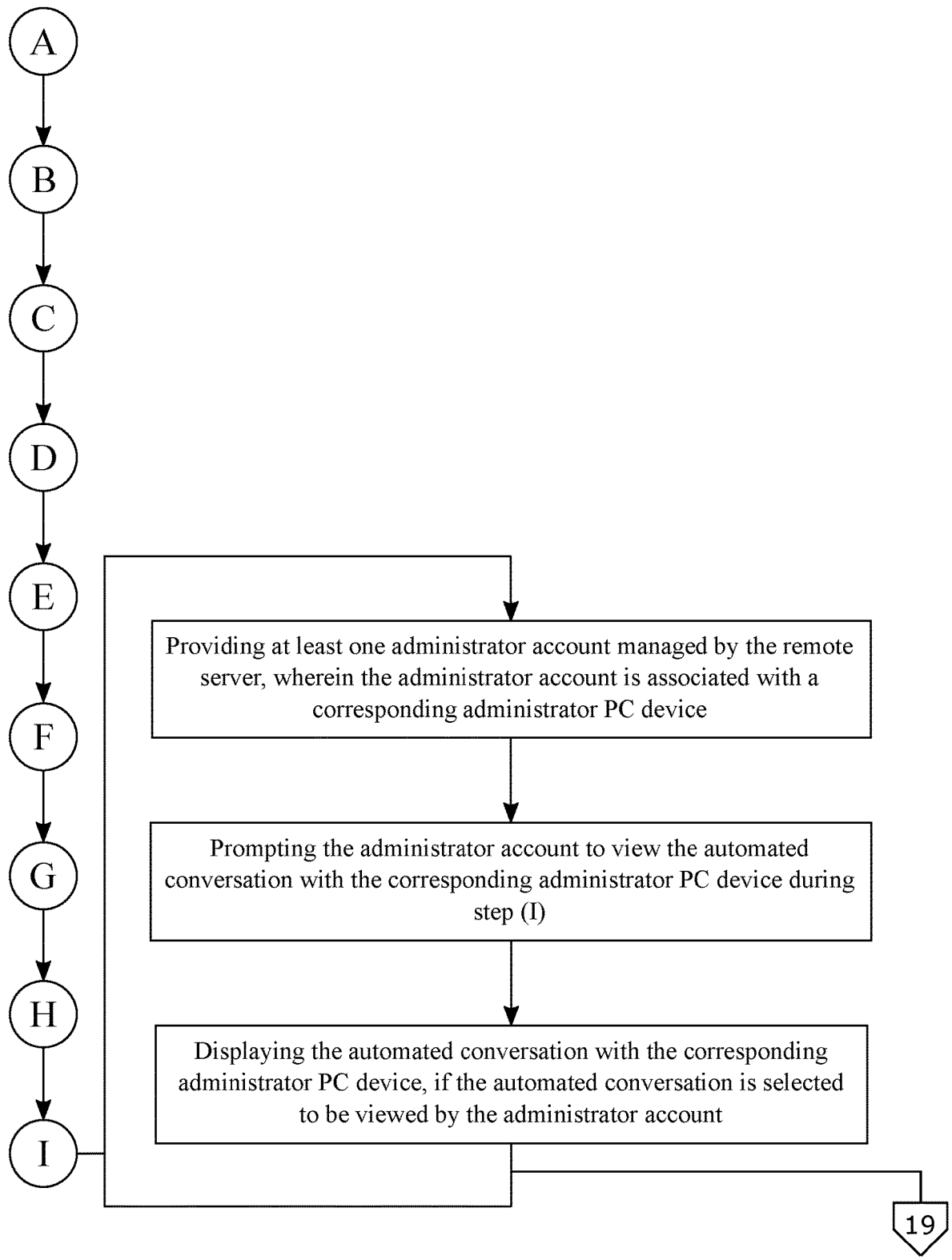
FIG. 18 is a process flow diagram representing administrator conversation-viewing access.

An employer may wish to view an ongoing conversation between the AI of the present invention and an employee. To enable this, at least one administrator account managed by the remote server may be provided, wherein the administrator account is associated with a corresponding administrator PC device, as represented in FIG. 18. The administrator account is preferably managed by an employer seeking to view conversations. The administrator account is prompted to view the automated conversation with the corresponding administrator PC device during Step I. The administrator therefore may elect to view any conversation between the AI of the present invention and any employee profile. The automated conversation is then displayed with the corresponding administrator PC device, if the automated conversation is selected to be viewed by the administrator account. Thus, a manager or employer may draw conclusions about an employee manually.

Figure 19:
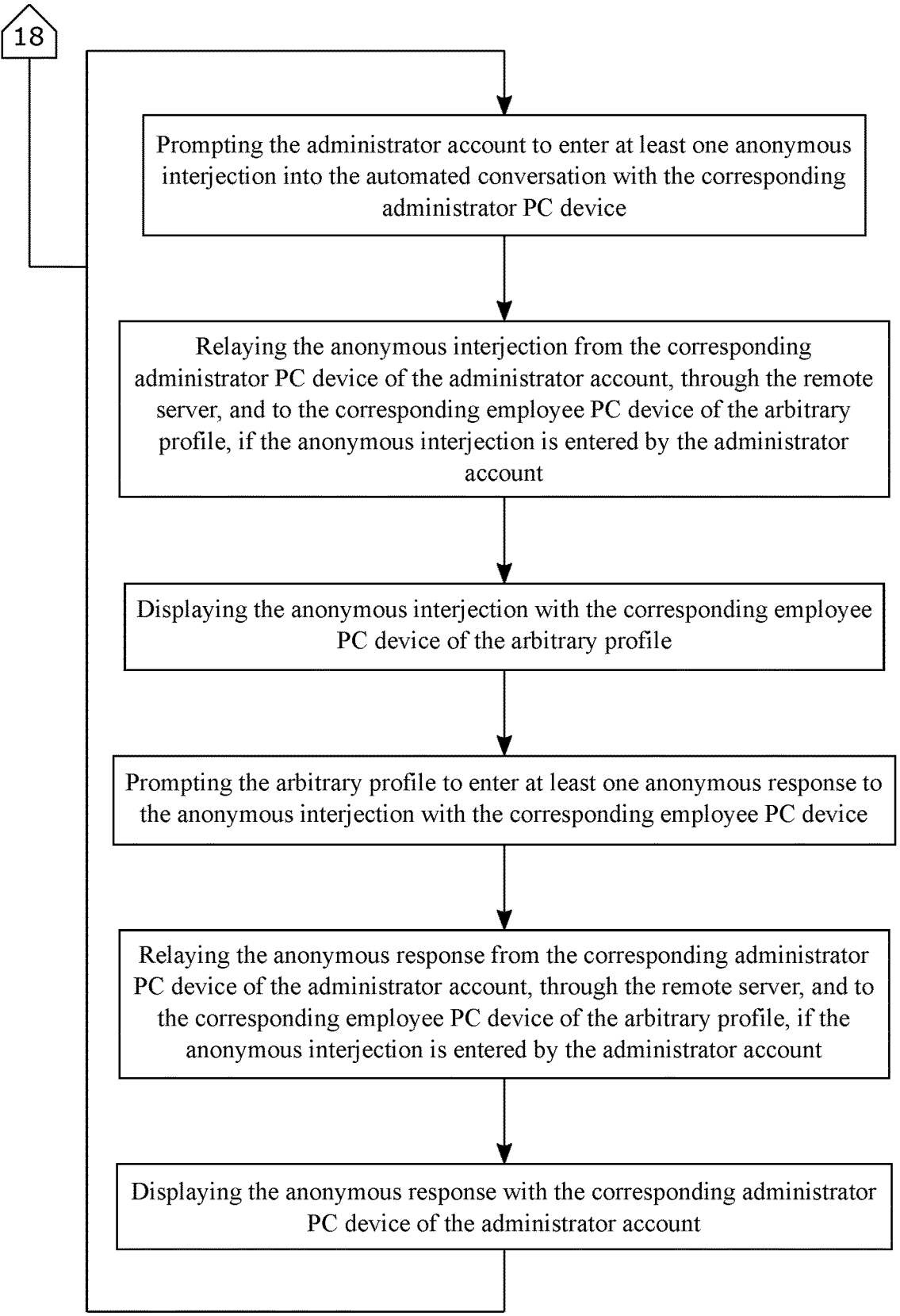
FIG. 19 is a process flow diagram representing administrator conversation-contributing access.

A manager may further wish to engage anonymously in conversation with an employee through the automated conversation. To this end, the administrator account is prompted to enter at least one anonymous interjection into the automated conversation with the corresponding administrator PC device, as represented in FIG. 19. The at least one anonymous interjection relates to any custom message that the administrator account enters. The anonymous interjection is next relayed from the corresponding administrator PC device of the administrator account, through the remote server, and to the corresponding employee PC device of the arbitrary profile, if the anonymous interjection is entered by the administrator account. In this way, the corresponding employee PC device receives the message from the administrator account rather than from the messaging AI itself. All relevant data and metadata are recorded and documented during this exchange. In a preferred embodiment, the corresponding employee PC device is anonymized as well, thus preventing the administrator account from targeting any particular employee. The anonymous interjection is displayed with the corresponding employee PC device of the arbitrary profile. Thus, the corresponding employee PC device displays the anonymous interjection as if the anonymous interjection came from the messaging AI. The arbitrary profile is then prompted to enter at least one anonymous response to the anonymous interjection with the corresponding employee PC device. This arrangement ensures anonymity in the message-sending process. The anonymous response is then relayed from the corresponding employee PC device of the arbitrary profile, through the remote server, and to the corresponding administrator PC device of the administrator account, if the anonymous response is entered by the arbitrary profile. Thus, the administrator PC device receives a response from the corresponding employee PC device. All relevant data and metadata are recorded and documented during this exchange. Finally, the anonymous response is displayed with the corresponding administrator PC device of the administrator account. In this way, the administrator account may interact anonymously with employees, and may receive an anonymous response accordingly.

Although the invention has been explained in relation to its preferred embodiment, it is to be understood that many other possible modifications and variations can be made without departing from the spirit and scope of the invention as hereinafter claimed.

What is claimed is:

1. A method of optimizing employee communication to improve workplace engagement and retention, the method comprises the steps of:
   (A) providing a plurality of employee profiles and at least one administrator account managed by at least one remote server, wherein each employee profile is associated with a corresponding employee personal computing (PC) device, and wherein each employee profile includes a conversation history, a sentiment history, and a decision history, and wherein the administrator account is associated with a corresponding administrator PC device, and wherein a natural-language processing engine is managed by at least one external server, and wherein the external server is communicably coupled to the remote server, and wherein a plurality of pre-determined activities is stored on the remote server;
   (B) providing a suggested activity engine managed by the remote server;
   (C) receiving at least one piece of conversation data from at least one arbitrary profile with the remote server, wherein the arbitrary profile is any profile from the plurality of employee profiles;
   (D) processing the piece of conversation data into a plurality of context scores with the remote server;
   (E) assessing at least one available activity for the arbitrary profile in relation to the context scores, the conversation history, the sentiment history, and the decision history for the arbitrary profile with the remote server;
   (F) executing the suggested activity engine with the remote server by inputting the available activity, the context scores, the conversation history, the sentiment history, and the decision history for the arbitrary profile into the suggested activity engine;
   (G) executing the suggested activity engine with the remote server by outputting a confirmed activity for the arbitrary profile with the suggested activity engine;
   (H) displaying the confirmed activity with the corresponding employee PC device of the arbitrary profile;
   (I) managing an automated conversation with the arbitrary profile by executing a plurality of iterations for steps (C) through (H);
   sequentially executing steps (C) through (H);
   prompting the administrator account to view the automated conversation with the corresponding administrator PC device during step (I); and
   displaying the automated conversation with the corresponding administrator PC device, if the automated conversation is selected to be viewed by the administrator account;
   executing the natural-language processing engine with the external server by inputting the piece of conversation data into the natural-language processing engine;
   executing the natural-language processing engine with the external server by outputting the context scores with the natural-language processing engine;
   relaying the context scores from the external server to the remote server during step (D);
   comparing the context scores to the conversation history of each employee profile with the remote server in order to identify contextual noise within the context scores;
   post-processing the contextual noise out of the context scores with the remote server after step (D);
   prompting the administrator account to enter at least one activity-related input with the corresponding administrator PC device;
   relaying the activity-related input from the corresponding administrator PC device to the remote server, if the activity-related input is entered by the administrator account;
   comparing each pre-determined activity to the activity-related input with the remote server in order to identify a plurality of employer-approved activities;
   designating the available activity as the confirmed activity with the remote server during step (G), if the available activity does match at least one of the plurality of employer-approved activities; and
   reassessing the confirmed activity for the arbitrary profile in relation to the activity-related input with the remote server during step (G), if the available activity does not match at least one of the plurality of employer-approved activities.

2. The method of optimizing employee communication to improve workplace engagement and retention, the method as claimed in claim 1 comprises the steps of:
generating a conversation-initiating message for the arbitrary profile with the remote server before step (C) in a first iteration, wherein the first iteration is from the plurality of iterations for steps (G) through (H); and
displaying the conversation-initiating message with the corresponding employee PC device of the arbitrary profile before step (C).

3. The method of optimizing employee communication to improve workplace engagement and retention, the method as claimed in claim 1 comprises the steps of:
generating a conversation-initiating message as the confirmed activity for the arbitrary profile with the remote server during step (H) in a previous iteration, if the piece of conversation data in the previous iteration is a no-response from the arbitrary profile, wherein the previous iteration is from the plurality of iterations for steps (G) through (H); and
displaying the conversation-initiating message with the corresponding employee PC device of the arbitrary profile before step (C) in a current iteration, wherein the current iteration is from the plurality of iterations for steps (G) through (H).

4. The method of optimizing employee communication to improve workplace engagement and retention, the method as claimed in claim 1 comprises the steps of:
generating a conversation-continuing message as the confirmed activity for the arbitrary profile with the remote server during step (H) in a previous iteration, if the piece of conversation data in the previous iteration is a response from the arbitrary profile, wherein the previous iteration is from the plurality of iterations for steps (G) through (H); and
displaying the conversation-continuing message with the corresponding employee PC device of the arbitrary profile before step (C) in a current iteration, wherein the current iteration is from the plurality of iterations for steps (G) through (H).

5. The method of optimizing employee communication to improve workplace engagement and retention, the method as claimed in claim 1 comprises the steps of:
generating an interaction message as the confirmed activity for the arbitrary profile with the remote server during step (H) in a previous iteration, wherein the previous iteration is from the plurality of iterations for steps (G) through (H), and wherein the interaction message includes a plurality of pre-determined responses;
displaying the interaction message with the corresponding employee PC device of the arbitrary profile before step (C) in a current iteration, wherein the current iteration is from the plurality of iterations for steps (G) through (H);
prompting the arbitrary profile to select at least one desired response with the corresponding employee PC device before step (C) in the current iteration, wherein the desired response is from the plurality of pre-determined responses; and
designating the desired response as the piece of conversation data for the arbitrary profile during step (C) in the current iteration.

6. The method of optimizing employee communication to improve workplace engagement and retention, the method as claimed in claim 5 comprises the step of:
appending the plurality of pre-determined responses and the desired response into the decision history of the arbitrary profile during each iteration of steps (C) through (H).

7. The method of optimizing employee communication to improve workplace engagement and retention, the method as claimed in claim 1 comprises the steps of:
prompting the administrator account to enter at least one noise-related input with the corresponding administrator PC device;
relaying the noise-related input from the corresponding administrator PC device to the remote server, if the noise-related input is entered by the administrator account;
comparing the context scores to the noise-related input with the remote server in order to identify contextual noise within the context scores; and
post-processing the contextual noise out of the context scores with the remote server after step (D).

8. The method of optimizing employee communication to improve workplace engagement and retention, the method as claimed in claim 1 comprises the steps of:
providing a plurality of pre-determined activities stored on the remote server;
comparing each pre-determined activity to the context scores with the remote server in order to identify a plurality of contextually-matching activities from the plurality of pre-determined activities;
comparing each contextually-matching activity to the conversation history, the sentiment history, and the decision history of the arbitrary profile with the remote server in order to identify at least one personally-matching activity from the plurality of contextually-matching activities; and
designating the personally-matching activity as the available activity with the remote server during step (E).

9. The method of optimizing employee communication to improve workplace engagement and retention, the method as claimed in claim 1 comprises the steps of:
comparing each employer-approved activity to the context scores with the remote server in order to identify a plurality of contextually-matching activities from the plurality of employer-approved activities;
comparing each contextually-matching activity to the conversation history, the sentiment history, and the decision history of the arbitrary profile with the remote server in order to identify at least one personally-matching activity from the plurality of contextually-matching activities; and
designating the personally-matching activity as the confirmed activity with the remote server during step (G).

10. The method of optimizing employee communication to improve workplace engagement and retention, the method as claimed in claim 1 comprises the steps of:
appending the piece of conversation data into the conversation history of the arbitrary profile with the remote server during each iteration of steps (C) through (H); and
appending the confirmed activity into the conversation history of the arbitrary profile with the remote server during each iteration of steps (C) through (H).

11. The method of optimizing employee communication to improve workplace engagement and retention, the method as claimed in claim 1 comprises the step of:

appending the context scores into the sentiment history of the arbitrary profile with the remote server during each iteration of steps (C) through (H).

12. The method of optimizing employee communication to improve workplace engagement and retention, the method as claimed in claim 1 comprises the steps of:

prompting the administrator account to enter at least one anonymous interjection into the automated conversation with the corresponding administrator PC device;

relaying the anonymous interjection from the corresponding administrator PC device of the administrator account, through the remote server, and to the corresponding employee PC device of the arbitrary profile, if the anonymous interjection is entered by the administrator account;

displaying the anonymous interjection with the corresponding employee PC device of the arbitrary profile;

prompting the arbitrary profile to enter at least one anonymous response to the anonymous interjection with the corresponding employee PC device;

relaying the anonymous response from the corresponding employee PC device of the arbitrary profile, through the remote server, and to the corresponding administrator PC device of the administrator account, if the anonymous response is entered by the arbitrary profile; and displaying the anonymous response with the corresponding administrator PC device of the administrator account.

\* \* \* \* \*